United States Patent
Camus

(10) Patent No.: US 9,488,209 B2
(45) Date of Patent: Nov. 8, 2016

(54) CLAMP FOR FASTENING A PANEL TO A HOLDER AND RESULTING ASSEMBLY

(71) Applicant: A Raymond Et Cie, Grenoble (FR)

(72) Inventor: Pascal Camus, Chamrousse (FR)

(73) Assignee: A. RAYMOND ET CIE, Grenoble (FR)

( * ) Notice: Subject to any disclaimer, the term of this patent is extended or adjusted under 35 U.S.C. 154(b) by 129 days.

(21) Appl. No.: 14/387,647

(22) PCT Filed: Nov. 28, 2013

(86) PCT No.: PCT/FR2013/052893
§ 371 (c)(1),
(2) Date: Sep. 24, 2014

(87) PCT Pub. No.: WO2014/108608
PCT Pub. Date: Jul. 17, 2014

(65) Prior Publication Data
US 2015/0043993 A1    Feb. 12, 2015

(30) Foreign Application Priority Data

Jan. 10, 2013   (FR) ...................... 13 50204

(51) Int. Cl.
*F16B 21/07*    (2006.01)
(52) U.S. Cl.
CPC ............. *F16B 21/073* (2013.01); *F16B 21/07* (2013.01); *F16B 21/075* (2013.01)
(58) Field of Classification Search
CPC .... F16B 21/07; F16B 21/073; F16B 21/075; F16B 21/076
USPC ....................................... 411/508
See application file for complete search history.

(56) References Cited

U.S. PATENT DOCUMENTS

| 4,644,612 | A  | * | 2/1987  | Osterland ............... F16B 5/065 24/289 |
| 6,074,150 | A  | * | 6/2000  | Shinozaki ........... B60R 13/0206 24/297 |
| 6,718,599 | B2 |   | 4/2004  | Dickinson et al. |
| 7,575,267 | B2 | * | 8/2009  | Nakajima .............. B60J 3/0221 296/97.9 |
| 8,316,514 | B2 | * | 11/2012 | Sano ....................... B60R 13/02 24/289 |
| 8,793,845 | B2 | * | 8/2014  | Benedetti ............... F16B 5/065 24/292 |
| 9,217,453 | B2 | * | 12/2015 | Masuda ................. B60N 3/026 |
| 2002/0194710 | A1 |   | 12/2002 | Dickinson et al. |

(Continued)

FOREIGN PATENT DOCUMENTS

| DE | 202012007754 U1 | 9/2012 |
| EP | 1 074 751 A1 | 2/2001 |
| EP | 2 175 146 A2 | 4/2010 |

(Continued)

*Primary Examiner* — Flemming Saether
(74) *Attorney, Agent, or Firm* — Ware, Fressola, Maguire & Barber LLP

(57) ABSTRACT

A fastener clip includes a head extended by a hollow body that is to be housed in the orifice of a support and that is to receive the anchor leg of a panel for fastening to the support, the body includes first and second elastically deformable flaps and presents a U-shape with branches including recesses housing said first and second flaps, each first and second flap is provided with at least one inside hook projecting into the inside of said U-shape for the purpose of locking said anchor leg in the U-shape of said fastener clip, and an outside hook projecting to the outside of said U-shape for the purpose of locking said support between said outside hook and said head (2). An assembly includes such a fastener clip.

9 Claims, 2 Drawing Sheets

(56) References Cited

U.S. PATENT DOCUMENTS

2012/0131771 A1* 5/2012 Hofmann .............. B60N 3/026
2012/0159749 A1* 6/2012 Itou ..................... H02G 3/26
                                                    24/457
2014/0093325 A1* 4/2014 Mizukoshi ........... F16B 13/063
                                                    411/45

FOREIGN PATENT DOCUMENTS

| FR | 2 796 999 A1 | 2/2001 |
| FR | 2 938 886 A1 | 5/2010 |
| JP | H11-230137 | 8/1999 |
| JP | 2009 197900 A | 9/2009 |
| KR | 2003-0035849 A | 5/2003 |

* cited by examiner

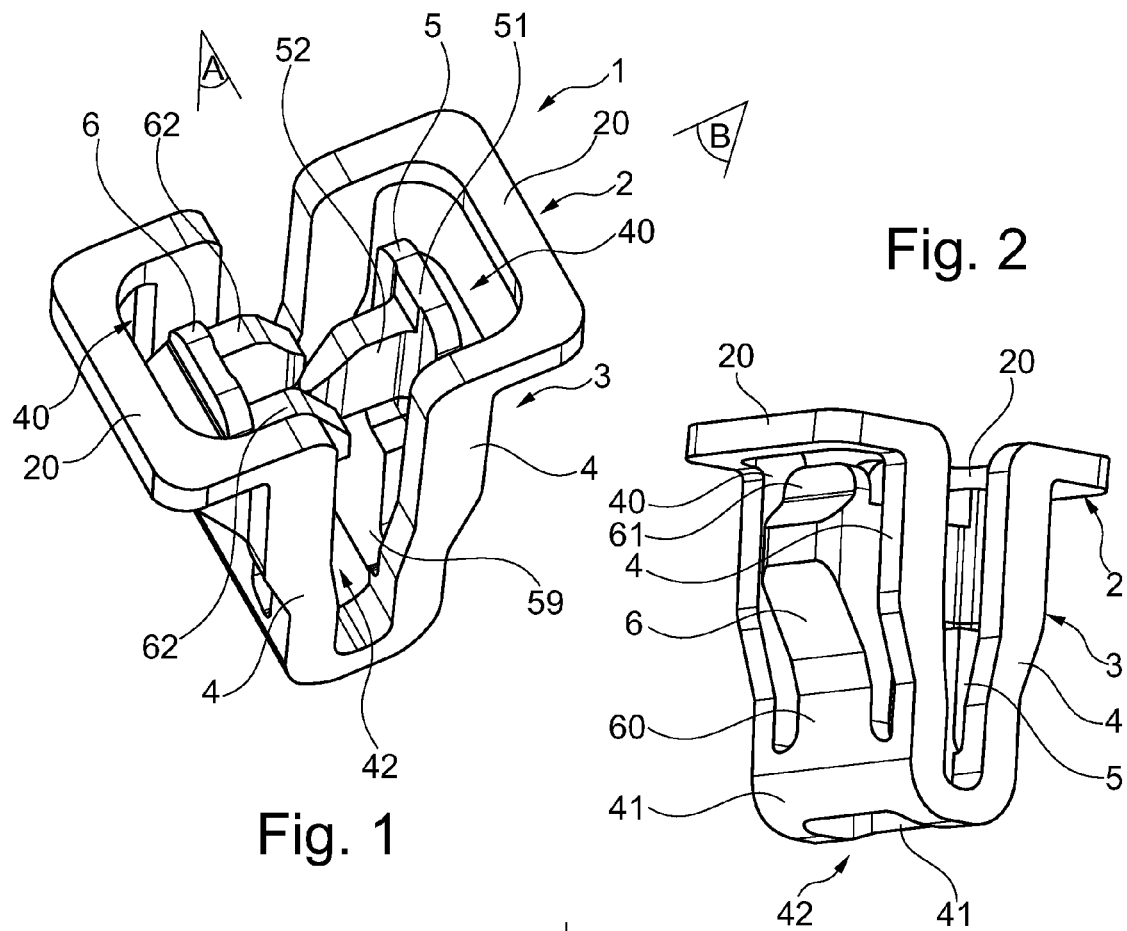
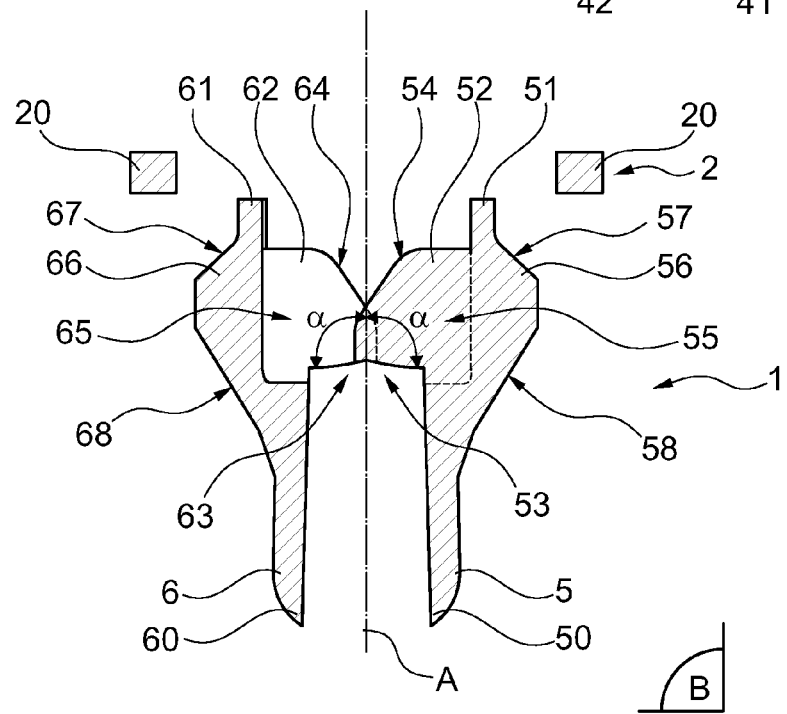
Fig. 1
Fig. 2
Fig. 3

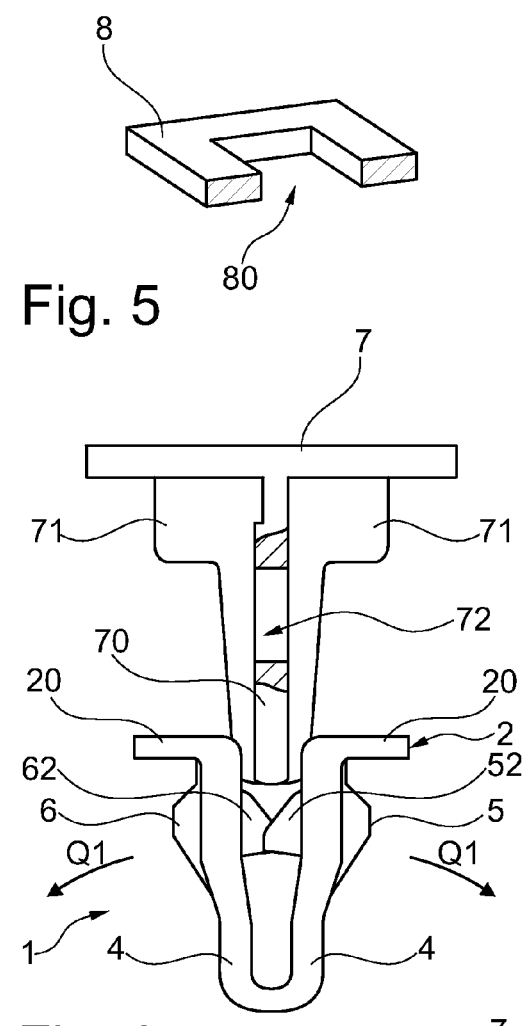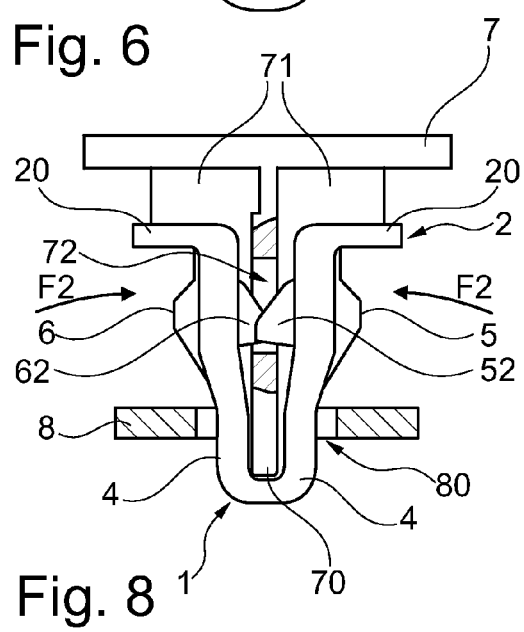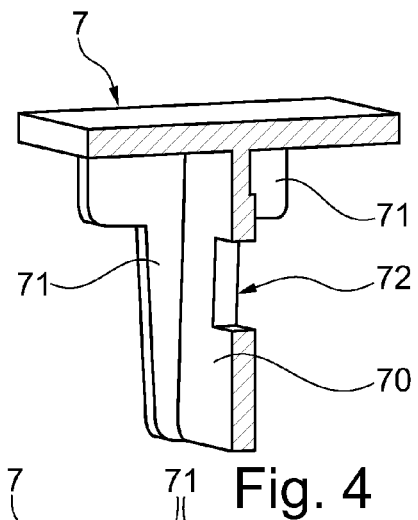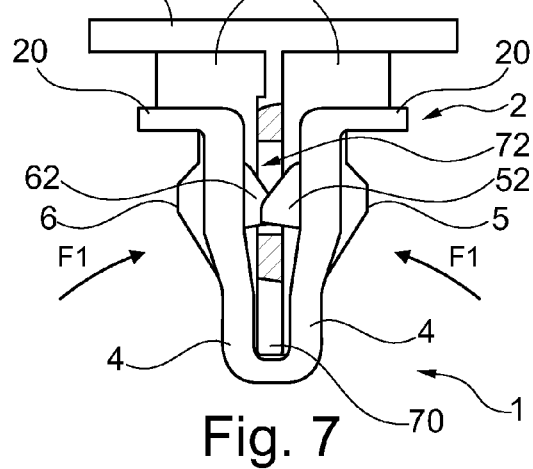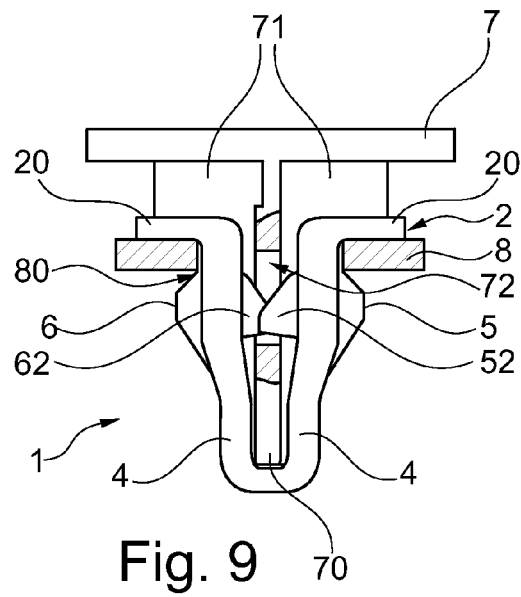

CLAMP FOR FASTENING A PANEL TO A HOLDER AND RESULTING ASSEMBLY

CROSS REFERENCE TO RELATED APPLICATIONS

This application is the U.S. National Stage of International Application Number PCT/FR2013/052893 filed on Nov. 28, 2013 which application claims priority under 35 USC §119 to French Patent Application No. 1350204 filed on Jan. 10, 2013. Both applications are hereby incorporated by reference in their entirety.

TECHNICAL FIELD

The invention relates in general to a fastener clip, e.g. for fastening a panel on a support.

BACKGROUND OF THE INVENTION

Prior Art

This type of fastener clip is particularly used in the automobile industry for fastening decorative covering or "trim" panels on the inside structure of a vehicle. These fastener clips can also be used in any other technical field for fastening panels or any other element to a support.

Publication EP 2 175 146 describes such a fastener clip for fastening a panel including an anchor leg provided with an orifice to a support that is provided with an orifice. The fastener clip includes a head presenting an O-shape from which there extends a U-shaped hollow body with a first elastically deformable flap being provided between its branches, the flap being arranged on a first side of the opening in the U-shape, and two second elastically deformable flaps arranged on a second side of the opening of the U-shape. The first and second flaps connect the base of the U-shape to the head of the fastener clip. The first flap is provided with an inside hook for being received in the orifice in the anchor leg inserted in the U-shape and for locking the panel to the fastener clip. During this insertion of the anchor leg into the hollow body, the first flap is deformed elastically towards the outside of the hollow body before relaxing towards the inside in order to be received in the orifice and lock the anchor leg in the clip. Each of the first and second flaps is provided with an outside hook for bearing under the support, at the periphery of the orifice in which the body is inserted. During this insertion of the fastener clip in the support orifice, the first and second flaps are deformed elastically towards the inside of the body before relaxing towards the outside in order to lock the support between the head and the outside hooks.

SUMMARY OF THE INVENTION

The object of the invention is to propose an alternative fastener clip that is easy to put into place with moderate assembly forces and that enables effective fastening to be ensured.

To this end, the invention provides a fastener clip having a head extended by a hollow body that is to be housed in the orifice of a support and that is to receive the anchor leg of a panel for fastening to the support, the body having first and second elastically deformable flaps, the clip being characterized in that the body presents a U-shape with branches including recesses housing the first and second flaps that are suitable for being deformed away from the outline of said branches towards the inside of the U-shape, and in that each of the first and second flaps is provided with at least one inside hook projecting into the inside of the U-shape for the purpose of locking the anchor leg in the U-shape, and an outside hook projecting to the outside of the U-shape for the purpose of locking the support between the outside hook and the head.

The idea on which the invention is based is to concentrate, on the first and second flaps, the functions of fastening firstly the panel to the fastener clip and secondly the fastener clip to the support. The idea on which the invention is based is also to enable the flaps to be set back relative to the branches that may thus act fully to provide guidance during assembly without being affected by the fastening function performed by the flaps.

The device of the invention may advantageously present the following features:

- each of the first and second flaps is provided with a first end secured to the base of the U-shape, and with a freely flexible second end oriented towards the head. Thus, the flaps can flex freely, thereby facilitating insertion of the panel in the fastener clip and insertion of the fastener clip in the support;
- the inside hooks are offset from each other in the midplane of the U-shape and are arranged, at rest, to overlap, with each of them crossing the midplane;
- each of the first and second flaps is provided with a setback facing respectively towards the other, second or first flap and provided in register respectively with the inside hooks of the other flap to receive the inside hook of the other flap when the first and second flaps are elastically deformed towards each other;
- the second flap includes a second inside hook arranged at least facing the gap between the second inside hook of the second flap;
- the outside hooks are connected to the first and second flaps that carry them by means of outside sliding surfaces that slope so as to converge towards each other on approaching the base of the U-shape, and in that the inside hooks are connected to the first and second flaps that carry them via inside sliding surfaces that slope so as to converge towards each other on approaching the base of the U-shape;
- the head is formed by two mutually disjoint rims extending on either side of the ends of the branches of the U-shape, each rim having a C-shaped recess;
- each inside hook defines a shoulder facing towards the base of the U-shape and forming an angle α with the midplane A of the U-shape beside the base of the U-shape, which angle α is greater than 90°; and
- the base of the U-shape is formed by two cross-members separated from each other by a flexing orifice encouraging relative flexing between the branches.

The invention also provides an assembly comprising a panel provided with an anchor leg and a support provided with an orifice, which panel and support are assembled together by means of a fastener clip as described above, the branches of the U-shape being in contact with the edges of the orifice in order to hold the fastener clip laterally in the orifice, the anchor leg being locked in the fastener clip by simultaneous action of the inside hooks, and the fastener clip being locked in the orifice by simultaneous action of the outside hooks.

Below, the terms "bottom" and "top" are used in non-limiting manner. Clearly the physical reality of these terms depends on the orientation of the U-shape of the body of the fastener clip. For the purposes of the description, the U-shape is assumed to be oriented with its opening facing upwards, as shown in the figures. The U-shape could naturally be considered as being oriented with its opening facing downwards, with the terms "bottom" and "top" as used in the description then needing to be inverted.

BRIEF DESCRIPTION OF THE DRAWINGS

The present invention can be better understood and other advantages appear on reading the following detailed description of an embodiment taken as a non-limiting example and illustrated by the accompanying drawings, in which:

FIGS. 1 and 2 are perspective views of the fastener clip of the invention;

FIG. 3 is a cross-section view on plane B of FIG. 1 showing the fastener clip of the invention with its two hooks being shown in the drawing:

FIGS. 4 and 5 are perspective views in section respectively of the panel with its anchor leg and the support with its orifice that are to be fastened together by means of the fastener clip of the invention; and FIGS. 6 to 9 are side views, partially in section, showing the steps of assembling the panel, the fastener clip, and the support in order to obtain the assembly of the invention.

DESCRIPTION OF AN EMBODIMENT

With reference to FIG. 1, the fastener clip 1 of the invention comprises a head 2 extended by a hollow body 3. The body 3 is in the form of a U-shape that is laterally open in its midplane A. On either side of the midplane A, the branches 4 of the U-shape are provided with respective recesses 40. The body 3 is thus in the form of two U-shapes. The bottom ends of the branches 4 of these two U-shapes are connected together at the bases of the U-shapes by two respective cross-members 41 that are visible in FIG. 2, which cross-members are rectilinear and separated from each other by a flexing orifice 42 in alignment on the midplane A. This flexing orifice 42 serves to confer a degree of flexibility between the branches 4. Thus, while making an assembly, the spacing between the branches 4 can be adjusted by flexing. Each top end of a branch 4 of a U-shape is secured to the top end of the corresponding branch 4 of the other U-shape by a C-shaped rim extending perpendicular to the midplane A and in which the opening faces towards the midplane A. The rims 20 are disjoint from each other and together they define the head 2 of the fastener clip 1.

The fastener clip 1 also has first and second flaps 5 and 6, each arranged in a respective one of the recesses 40. The first and second flaps 5 and 6 extend substantially parallel to the branches 4 of the U-shapes. The first and second flaps 5 and 6 are elastically deformable so as to be capable of moving apart from each other on either side of the midplane A, and of moving towards each other towards the midplane A. The (bottom) first end 50, 60 of each of the first and second flaps 5, 6 is secured to the corresponding cross-member 41 in the base of the U-shape. The (top) second end 51, 61 is free, i.e. it is independent and freely flexible relative to the remainder of the body 3. Thus, the first and second flaps 5 and 6 can flex easily.

The first flap 5 has an inner hook 52 comprising an inner shoulder 53 projecting beyond the inside wall of the U-shape. At rest (without any flexing of the first flap 5), the inside hook 52 crosses the midplane A and the inside shoulder 53 forms an angle α relative to the midplane of the U-shape, beside the base of the U-shape, that is visible in FIG. 3 and that is greater than 90°. The second flap 6 has two inside hooks 62, each having an inside shoulder 63 projecting from the inside wall of the U-shape. At rest (without flexing of the second flap 6), the inside hooks 62 cross the midplane A and the inside shoulders 53 form an angle α relative to the midplane of the U-shape beside the base of the U-shape, that can be seen in FIG. 3 and that is greater than 90°. Thus, as shown in detail in FIG. 3, and at rest, the inside hooks 52 and 62 overlap. The inside hooks 52 and 62 are arranged in such a manner that, at rest, the inside hook 52 of the first flap 5 lies in the gap between the two inside hooks 62 of the second flap 6. When the first and second flaps 5 and 6 are flexed away from the midplane A, the inside hook 52 of the first flap 5 faces the gap between the two inside hooks 62 of the second flap 6. This interleaved configuration serves to guarantee that fastening is stable. The inside shoulders 53 and 63 are connected respectively to the first and second flaps 5 and 6 carrying them via inside sliding surfaces 54 and 64 that slope so as to converge towards each other on going towards the base of the U-shape.

Each first and second flaps 5, 6 is also provided with a setback 55, 65 facing respectively towards the other flap 6, 5, i.e. the second or the first flap. The setback 55 of the first flap 5 faces the inside hooks 62 of the second flap 6. The setback 65 of the second flap 6 faces the inside hook 52 of the first flap 5. Thus, when the first and second flaps 5 and 6 are elastically deformed towards each other, each setback 55, 65 is suitable for receiving the corresponding inside hook 62, 52.

Finally, each of the first and second flaps 5 and 6 is also provided with an outside hook 56, 66 including an outside shoulder 57, 67 projecting beyond the outside wall of the U-shape. The outside shoulders 57, 67 may be provided facing each other on either side of the midplane A. The outside shoulders 57, 67 are connected to the first and second flaps 5, 6 that carry them via outside sliding surfaces 58, 68 that slope so as to converge towards each other on approaching the base of the U-shape.

In order to obtain the assembly of the invention, use is made of a fastener clip 1, of a panel 7, and of a support 8 as described below.

With reference to FIG. 4, the panel 7 is for example substantially plane and provided with an anchor leg 70 that is substantially plane and that extends perpendicularly to the panel 7. The anchor leg 70 is connected to the panel 7 by ribs 71 for increasing its stiffness. The anchor leg 70 is also pierced by an opening 72.

With reference to FIG. 5, the support 8 is provided with a through orifice 80, e.g. of rectangular shape. It is preferable to select a through orifice 80 of width that is slightly smaller than the width of the body 3 of the fastener clip 1.

The assembly is obtained by proceeding as described below.

Initially, and with reference to FIG. 6, the panel 7 is secured to the fastener clip 1. To do this, the anchor leg 70 is inserted by being moved in translation into the slot of the U-shape of the fastener clip 1. During this insertion, the free end of the anchor leg 70 bears against the inside sliding surfaces 54 and 64 of the first and second flaps 5 and 6. The slope of the inside sliding surfaces 54 and 64 encourage the first and second flaps 5 and 6 to space apart from each other in the opening direction as represented by arrows O1. The first and second flaps 5 and 6 flex sufficiently so that they are spaced apart far enough to allow the anchor leg 70 to pass between the inside hooks 52 and 62 until the inside hooks 52 and 62 come into register with the opening 72 in the anchor leg 70.

With reference to FIG. 7, when the inside hooks 52 and 62 face the opening 72, the first and second flaps 5 and 6 relax and return towards each other in the closure direction represented by arrows F1. The inside hooks 52, 62 are then received in the opening 72 through which they pass. The overlap of the inside hooks 52 and 62 serves to consolidate the fastening between the anchor leg 70 and the fastener clip 1.

Thereafter, and with reference to FIG. 8, the assembly obtained between the panel 7 and the fastener clip 1 is secured to the support 8. To do this, the fastener clip 1 carrying the panel 7 is inserted by being moved in translation into the orifice 80 in the support 8. During this insertion, the periphery of the orifice 80 bears against the outside sliding surfaces 58 and 68 of the first and second flaps 5 and 6. The slope of the outside sliding surface 58 and 68 encourages the first and second flaps 5 and 6 to move towards each other in the closure direction represented by arrows F2. The first and second flaps 5 and 6 remain flexed, close to each other, so as to allow the outside hooks 56 and 66 to pass beyond the orifice 80. Thus, during this insertion, the first and second flaps are at most flush with the outline of the U-shape, thereby enabling the branches to come into contact with the orifice 80. Thus, during this insertion, since the orifice 80 is not as wide as the body 3 of the fastener clip 1, the branches 4 in contact with the periphery of the orifice 80 are deformed a little towards each other. The branches 4 thus serve to guide the fastener clip 1 accurately while it is being assembled with the support 8.

With reference to FIG. 9, when the outside hooks 56 and 66 have gone beyond the orifice 80, the first and second flaps 5 and 6 relax and move apart from each other in the opening direction represented by arrows O2. The head 2 of the fastener clip 1 bears against the top of the support 8 around the orifice 80, and the outside hooks 56 and 66 bear under the support 8 around the orifice 80, opposite from the head 2. Assembly is thus terminated between the panel 7, the support 8, and the fastener clip 1.

The panel 7, the support 8, and the fastener clip 1 can be separated from one another by performing the inverse operations.

The invention makes it possible to achieve the above-mentioned objects. The first and second flaps 5 and 6 are easily deformable while inserting the anchor leg 70 into the fastener clip 1 and while inserting the fastener clip 1 into the support 8. Assembly is thus obtained using forces that are moderate. Furthermore, the overlap of the inside hooks 52 and 62 makes the assembly more reliable.

In addition, the fact that each of the first and second flaps 5 and 6 has both an outside hook 56, 66 and one or more inside hooks 52, 62 enables the fastening to be made reliable.

In addition, since the branches 4 of the body 3 do not have any inside or outside hooks, they can serve during assembly to provide reliable guidance of the fastener clip 1 through the orifice 80. The fastening functions are performed by the outside hooks 56, 66 and the inside hooks 52, 62 carried by the fastener flaps 5 and 6, which thus perform two fastener functions, one with the panel 7 and another with the support 8. The branches 4, which are subjected to very little deformation, can thus act fully in performing their guidance role.

Naturally, the present invention should not be limited to the above description of one of its embodiments, which may be modified without thereby going beyond the ambit of the invention.

What is claimed is:
1. A fastener clip comprising:
a head extended by a hollow body that is to be housed in an orifice of a support and that is to receive an anchor leg of a panel for fastening to said support, said body having first and second elastically deformable flaps, said body having a U-shape with branches, including recesses housing said first and second flaps, the first and second flaps deformable away from an outline of said branches towards an inside of the U-shape of the body, the first and second flaps each having at least one inside hook projecting into the inside of said U-shape of the body so as to lock said anchor leg in said U-shape of the body, and an outside hook projecting to the outside of said U-shape of the body so as to lock said support between said outside hook and said head, wherein said inside hooks arranged on each flap are offset from each other in a midplane of said U-shape of said body and are arranged to overlap, with each of the inside hooks crossing said midplane, when at rest.

2. The fastener clip according to claim 1, wherein the first and second flaps each have a first end secured to the base of said U-shape of the body, and a freely flexible second end oriented towards said head.

3. The fastener clip according to claim 1, wherein said first flap has a setback facing towards said second flap, said second flap has a setback facing said first flap, and each flap is in registry respectively with the inside hook of said other flap to receive said inside hook of said other flap when said first and second flaps are elastically deformed towards each other.

4. The fastener clip according to claim 1, wherein said second flap includes two second inside hooks, wherein said inside hook of said first flap faces the gap between said two second inside hooks of said second flap when said first and second flaps are flexed away from said midplane, and wherein said inside hook of said first flap lies in the gap between said two second inside hooks of said second flap when at rest.

5. The fastener clip according to claim 1, wherein said outside hooks are connected to said first and second flaps that carry said outside hooks by means of outside sliding surfaces that slope so as to converge towards each other upon approaching the base of said U-shape of the body, and wherein said inside hooks are connected to said first and second flaps that carry said outside hooks via inside sliding surfaces that slope so as to converge towards each other on approaching the base of said U-shape of the body.

6. The fastener clip according to claim 1, wherein said head is formed by two mutually disjoint rims extending on either side of the ends of the branches of said U-shape of the body, each rim having a C-shaped recess.

7. The fastener clip according to claim 1, wherein the base of said U-shape of the body is formed by two cross-members separated from each other by a flexing orifice encouraging relative flexing between said branches.

8. The fastener clip according to claim 1, wherein each inside hook defines a shoulder facing towards the base of said U-shape of the body and forming an angle with a midplane of said U-shape beside the base of said U-shape, which angle is greater than 90°.

9. An assembly comprising:
a panel having an anchor leg, and
a support having an orifice,
the panel and the support being assembled together by a fastener clip formed therein according to claim 1, wherein said branches of said U-shape of the body of the fastener clip are in contact with edges of said support orifice in order to hold said fastener clip laterally in position in said support orifice, wherein said anchor leg is locked in said fastener clip by simultaneous action of said inside hooks of the fastener, and wherein said fastener clip is locked in said support orifice by simultaneous action of said outside hooks of the fastener hooks.

\* \* \* \* \*